United States Patent [19]

Klawitter

[11] 4,270,306
[45] Jun. 2, 1981

[54] TOY DRIVING SIMULATOR WITH BRAKE

[75] Inventor: Ronald R. Klawitter, Hermann, Mo.

[73] Assignee: Steven Manufacturing Company, Hermann, Mo.

[21] Appl. No.: 109,231

[22] Filed: Jan. 3, 1980

[51] Int. Cl.³ .................. A63H 17/00; G09B 9/02; A63B 67/00; A63F 9/00
[52] U.S. Cl. .................. 46/248; 273/1 GA; 434/70
[58] Field of Search ............ 46/248; 273/86 F, 85 G, 273/1 GA; 35/11 R; 272/34, 35

[56] References Cited

U.S. PATENT DOCUMENTS

| | | | |
|---|---|---|---|
| 2,148,828 | 2/1939 | Myers | 35/11 R |
| 2,814,131 | 11/1957 | Sheppard | 35/11 R |
| 2,908,087 | 10/1959 | Weinrich et al. | 35/11 R |
| 2,943,855 | 7/1960 | Javna et al. | 35/11 R |
| 3,119,190 | 1/1964 | Cafulli et al. | 46/248 |
| 3,525,175 | 8/1970 | Wolf | 35/11 R |
| 3,790,172 | 2/1974 | Nakamura | 273/313 |
| 4,174,833 | 11/1979 | Hennig et al. | 273/1 GA |
| 4,189,145 | 2/1980 | Stubben et al. | 273/313 |

*Primary Examiner*—Robert Peshock
*Assistant Examiner*—Michael J. Foycik, Jr.
*Attorney, Agent, or Firm*—Polster, Polster & Lucchesi

[57] ABSTRACT

A toy driving simulator has a body in the form of a vehicle, e.g., automobile, boat, snowmobile, tank or spaceship, within which is a selectively driven belt upon which a path or paths to be followed and obstacles to be avoided are depicted. A miniature vehicle to be steered is connected to be moved laterally with respect to the belt by a manipulatable steering device. The path-displaying surface of the belt and the miniature vehicle are viewable in a mirror that is generally, but not necessarily, in the form of the inside surface of a simulated windshield.

2 Claims, 11 Drawing Figures

TOY DRIVING SIMULATOR WITH BRAKE

BRIEF SUMMARY

A toy driving simulator has a hollow body in the form of a vehicle having a windshield with a reflecting inner surface, a steering mechanism with a manipulatable part projecting out of the body and connected to move a miniature vehicle within the body. The miniature vehicle, which is observable in the mirrored surface from outside the body by the person manipulating the steering mechanism is mounted above a selectively driven belt, preferably endless, upon the surface contiguous the miniature vehicle of which is a representation of a path to be traversed by that vehicle, which is also observable in the mirrored surface. Preferably, a brake mechanism is provided for stopping the belt or slowing it down, or both. Various embodiments of steering and drive mechanisms are disclosed.

DRAWINGS

DETAILED DESCRIPTION

Figure 1:
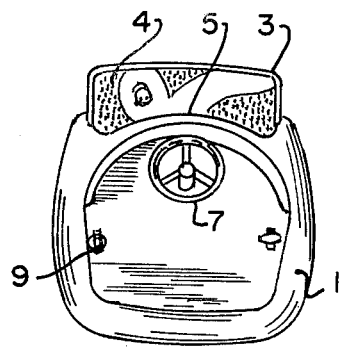
FIG. 1 is a view in rear elevation of one embodiment of toy driving simulator of this invention.
Figure 2:
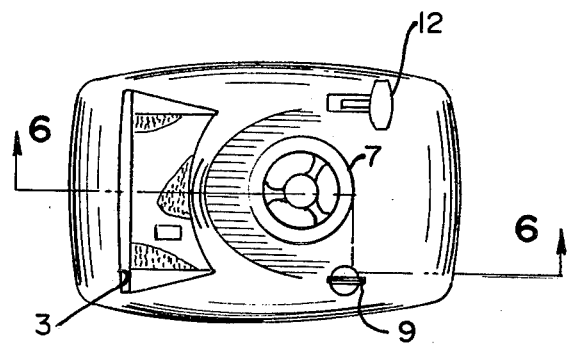
FIG. 2 is a top plan view.
Figure 4:
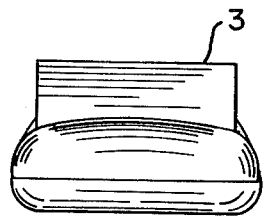
FIG. 4 is a view in front elevation.
Figure 3:
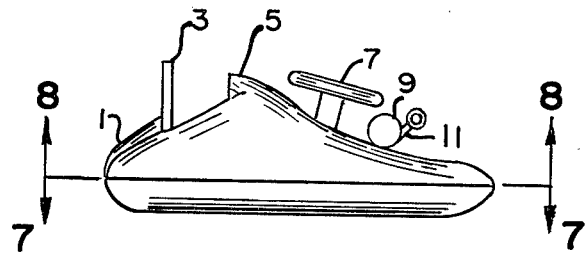
FIG. 3 is a view in side elevation.
Figure 5:
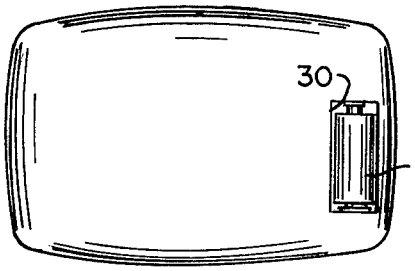
FIG. 5 is a bottom plan view.

Referring now to FIGS. 1 through 8 of the drawing for one illustrative embodiment of this invention, reference numeral 1 indicates a hollow body in the form of a vehicle, from which a steering wheel 7, a key 9 and a brake lever 11 extend.

The body 1 has a windshield 3, provided with a reflecting inner surface 4 which can be plated or secured directly to the windshield 3 or formed separately and mounted. The reflecting inner surface, in any event, is positioned to present to the eye of one manipulating the steering wheel 7, the reflected image of the interior of the hollow body 1.

The steering wheel 7, which, in this embodiment is shown as a conventional automobile steering wheel, but which can take the form of a tiller, a ship's wheel or aircraft yoke, for example, is operatively connected to a steering mechanism 8 inside the hollow body 1, by means of a steering wheel shaft 38, passing through a steering wheel shaft opening-defining sleeve 36 in the body.

The steering mechanism is connected to a miniature vehicle 15, which, in this embodiment, is in the form of an automobile, the front of which is connected to the steering mechanism and the rear of which is nearest the windshield.

In this embodiment, an upper reach of an endless belt 17 is positioned immediately beneath the vehicle 15. Preferably at least the rear portion of the vehicle rests lightly on the upper surface of the upper reach of the belt. The outer surface of the belt has on it a path representation 18, which in the embodiment shown, is in the form of a road with branches or other obstacles or choices. The endless belt 17 tends around an idler roll 51 at an end beneath and slightly forward of the windshield 3 and around a belt drive roll 50, which is part of a belt drive mechanism 19.

In the embodiment shown in FIGS. 1 through 8, the belt drive mechanism 19 is electrical, with a motor 45, a gear train 46 and gear train mounting walls 47. The gear train 46 is conventional, serving as a speed reducer merely to reduce the speed from the motor to the belt drive roll. The belt drive roll and idler roll are journalled suitably in such a way that they can be mounted and demounted for installation and replacement of belts.

A battery 44, mounted in a battery recess 30 in the body 1 is electrically connected through a switch 43, operatively connected to the key 9, to the motor 45.

In the present embodiment, the brake lever 11, which is provided with a handle 12, and which extends through a body slot 35, is gravity biased toward a released position, and is arranged to bear, when pushed in the opposite direction, at its lower end, by means of a pivot arrangement, upon a projecting stub shaft of the belt drive roll, to slow the roll mechanically. However, as is apparent, the brake lever in the electrically driven belt drive mechanism embodiment can be connected to a rheostat, or a switch, or both. If the battery is also connected to a light to illuminate the interior of the housing, the brake lever can be arranged only to turn off the motor and not the light, the latter being a function of the key switch.

Figure 6:
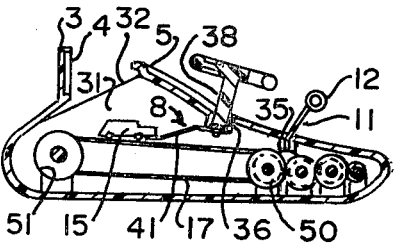
FIG. 6 is a sectional view taken along the line 6—6 of FIG. 2.
Figure 7:
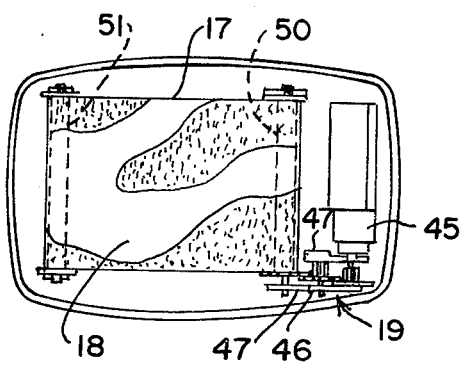
FIG. 7 is a sectional view taken along the line 7—7 of FIG. 3.
Figure 8:
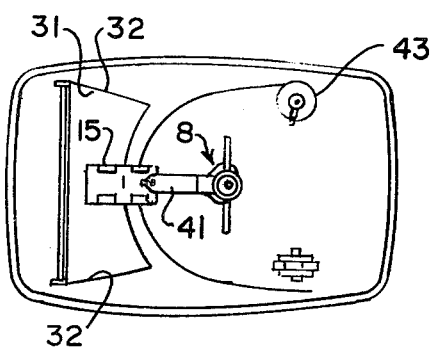
FIG. 8 is a view taken along the line 8—8 of FIG. 3.

In the embodiment shown in particular in FIGS. 6 and 8, the steering mechanism 8 is a simple direct one, with a transparent thin, flat but stepped arm 41 connected to the lower end of the steering wheel shaft 38, and pivotally connected to the underside of the vehicle 15, below the hood part, at its other end.

In operation, the belt is caused to rotate by turning the key to close the switch 43 to energize the motor. The belt rotates so that the upper reach of the belt moves to the left as viewed in FIG. 6, in a direction toward the windshield. The rather loose pivotal connection of the vehicle to the arm 41 makes the movement of the vehicle in response to turning of the wheel 7 quite realistic. The light friction of the belt and the touching portion of the vehicle keeps the vehicle's rear in the proper position and the front end swings. The vehicle, viewed in the mirrored surface 4 through a body viewing opening 31 defined by the windshield, dashboard and side edges 32, appears to move down the road of the path representation, in response to manipulation of the steering wheel 7, and to slow or stop in response to the manipulation of the handle 12 of the brake lever 11.

Figure 9:
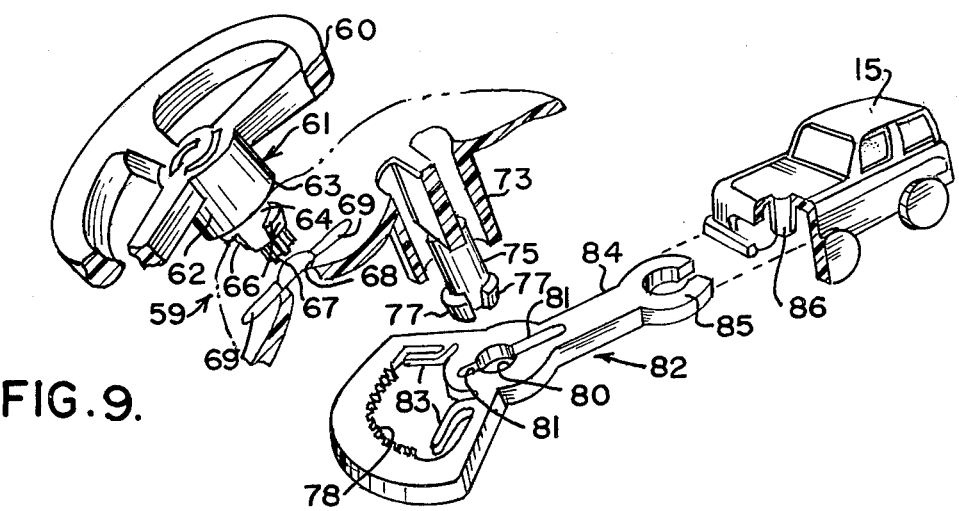
FIG. 9 is an exploded view in perspective, partly broken away, of another embodiment of steering mechanism for use in the driving simulator of this invention.

Referring now to FIG. 9 for a more refined embodiment of steering mechanism, a steering mechanism 59 includes a steering wheel 60 with a concentric shaft 61 with a large diameter section 62, a concentric smaller diameter section 64 defining between them a radial bearing surface 63, a pair of diametrically opposed lock wedges integral with the shaft and spaced axially from the bearing surface 63, and a pinion 67. The locking wedges are divergent in a direction toward the bearing surface 63.

A shaft-receiving opening 68 in the body 1, has a circular center section and two elongated slots 69 projecting diametrically from the circular section. The slots 69 permit the body shell to deform sufficiently to permit the locking wedges to be forced through, and permit the shell to snap back into the channel defined between the bearing surface 63 and the upper surfaces of the wedges 66.

The housing is provided with an inwardly projecting tubular sleeve 73 bisected by a diametrically extending support of which a post 75 is a continuation, all integral with the body. A lower edge of the sleeve forms, with upper surfaces of a pair of wedge segments 77 integral with the post, opposed bearing surfaces between which a link mechanism 82 is caged.

The link mechanism 82, in the embodiment shown, includes an arcuate rack section 78, the teeth of which are arranged in an arc of a circle the center line of which is coincident with the center line of the post and a post opening 80 in the steering link mechanism. The steering mechanism post opening 80 has a circular section adapted to embrace the post 75 for rotation, and a pair of elongated slots 81 which permit the steering link mechanism to deform sufficiently to let the wedges 77 be forced through the opening 80 and to snap back, to mount the steering link mechanism rotatably on the post 75. When so mounted, the teeth of the pinion 67 mesh with the teeth of the rack 78. The steering link mechanism includes a blade 84, terminating in a split mounting ring 85. The vehicle 15 in this embodiment is provided with a tapered mounting plug 86 that fits loosely within the slot ring 85, but which is large enough not to be dislodged therefrom. In this embodiment, as well as in the embodiment shown in FIG. 10, the arcuate rack 78 is bounded by flexible stop arms 83, made integral with the steering link mechanism, which tend to prevent binding of the pinion and rack at the end of their travel.

Figure 10:
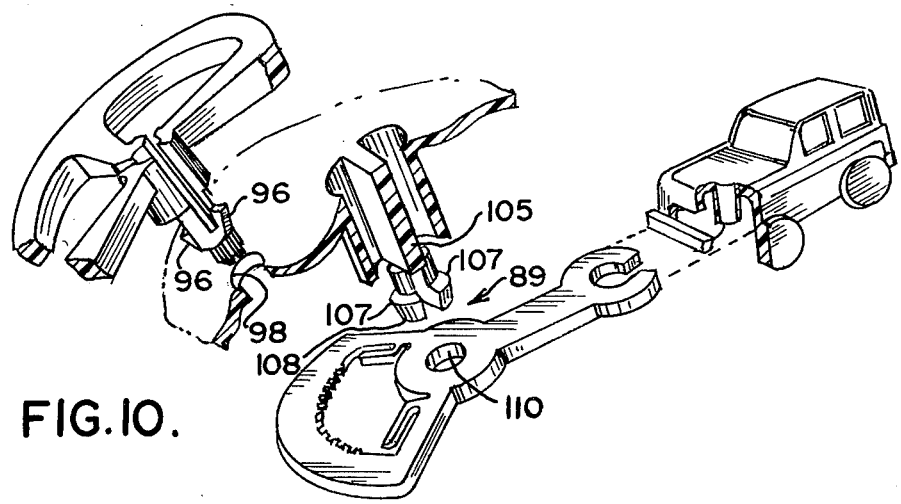
FIG. 10 is an exploded view in perspective, partly broken away, of another embodiment of steering mechanism for use in the driving simulator of this invention.

In the embodiment of steering mechanism shown in FIG. 10, the steering mechanism 89 includes the same kind of wheel and enlarged section and reduced section of steering wheel shaft as that of FIG. 9. In this embodiment, however, instead of a solid shaft and locking wedges, the shaft is slotted part way, and resilient locking ears, integral with the shaft at their lower ends, are separated at their upper ends, so as to be able to flex sufficiently to permit them to pass through a circular opening 98 in the body but to snap out to hold the shaft in position when they have cleared the inner surface of the body.

Similarly, a post 105 is slotted diametrically from its lower end, to permit the post to deform diametrically to permit wedge segments 107 to pass through a circular hole 110 in the steering link mechanism, and to snap outwardly to hold the steering link mechanism in place.

Figure 11:
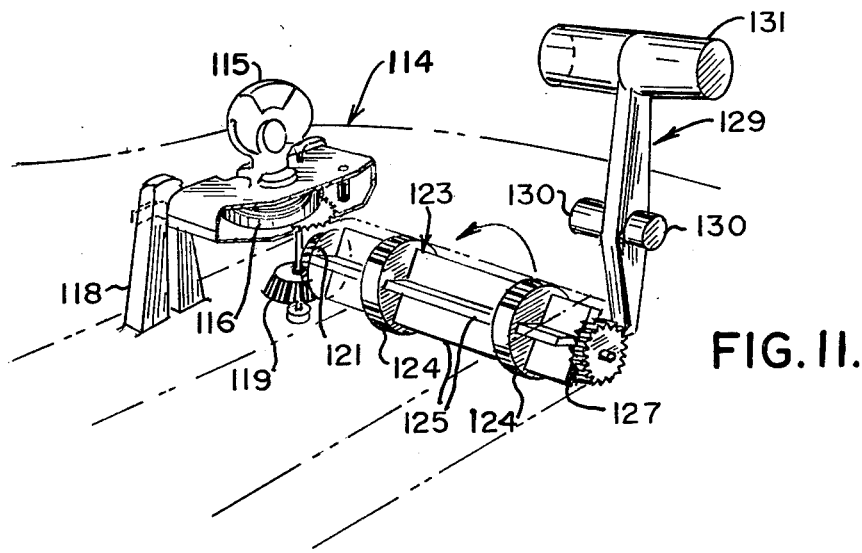
FIG. 11 is a view in perspective of a spring-operated belt driving mechanism.

Referring now to FIG. 11, for an illustrative emnbodiment of spring operated belt driving mechanism, reference numeral 114 indicates a manually wound spring drive of conventional construction, wound by a key 115 projecting through the body 1. A spring 116 a housing of which is supported by a stanchion 118, is connected to drive a bevel gear 119 that meshes with a drive gear 121 on one end of a drive drum 123. The drive drum 123 is made up of spaced wheels 124 connected by a runner 125 made of perpendicularly intersecting ribs which extend between and beyond the wheels 124. The drive gear 121 is mounted on or made integral with the end of the runner 125 at one end, while a brake sprocket 127 is mounted on or made integral with the runner 125 at its other end. Stub shafts project outwardly beyond the drive gear and brake sprocket at either end, and suitable journals are provided to permit the drive drum to rotate freely.

In this embodiment, a brake lever 129 has a handle 131 at its upper end, a pair of stub axles, suitably journaled, intermediate its ends, and a lower end adapted to engage the teeth on the brake sprocket 127.

The endless belt is mounted on and around the drum 123, and a similar idler drum at its other end.

Numerous variations in the construction of the toy drive simulator of this invention, within the scope of the appended claims, will occur to those skilled in the art. Merely by way of illustration, and not of limitation, not only can the body of the vehicle assume different shapes so as to simulate different kinds of vehicles, but the "windshield," in certain of the vehicles may take different forms as, for example, in simulation of a military tank, in which a periscope-like arrangement may be employed. Although endless belts are preferred for simplicity's sake, replaceable belts that are wound on spools, and drawn across the line of vision to another spool upon which they are wound can be used. Th path representations on the observable surface of the belt may include portions that are untraversable, or may represent apparently untracked expanses of space occupied only by celestial objects or the like. The endless belt can be reversible. The belt driving mechanism can be made reversible to give the viewer the illusion of backing, and the practice in maneuvering the vehicle backwards. In the construction and assembly of embodiments of steering mechanism similar to those shown in FIGS. 9 and 10, the steering wheel or tiller etc. can be made hollow, and the posts with their appended pinions can be made separate and either force fitted or snapped into place. The steering mechanism posts can be made similarly. In both instances, the posts or shafts can be provided with annular flanges rather than wedge segments. These variations are, as has been indicated, merely illustrative.

Having thus described the invention, what is claimed and desired to be secured by Letters Patent is:

1. A toy driving simulator comprising a hollow body in the form of a vehicle having a windshield with a reflective inner surface, a steering mechanism rotatably mounted on and having a part extending within said body, a miniature vehicle mounted within said body and connected to be moved laterally of said body by means of said steering mechanism; a belt, one reach of which extends beneath said miniature vehicle, said belt having on its outer surface representation of a path along which the said miniature vehicle is to be directed; means for driving said belt, and brake means having a lever extending through and pivotally mounted in said body, said brake means being selectively engagable with a part of said belt driving means by manipulation of said lever, both said miniature vehicle and said upper surface of said belt being observable in said reflecting surface by one manipulating the steering mechanism.

2. The simulator of claim 1 wherein said belt-carrying roll has on it a serrated wheel, the serrations of which are engaged by a part of said lever when said lever is in one position and disengaged when said lever is in another position.

* * * * *